United States Patent [19]
Inuiya

[11] 3,821,623
[45] June 28, 1974

[54] MEANS FOR DETECTING OPERATION OF SERVO-SYSTEM

[75] Inventor: Masafumi Inuiya, Asaka, Japan

[73] Assignee: Fuji Photo Film Co., Ltd., Kanagawa, Japan

[22] Filed: Jan. 19, 1973

[21] Appl. No.: 324,904

[30] Foreign Application Priority Data
Jan. 20, 1972  Japan................................ 47-7881

[52] U.S. Cl. ............................... 318/490, 318/565
[51] Int. Cl. ......................................... G05b 23/02
[58] Field of Search ............ 318/490, 565; 340/248

[56] References Cited
UNITED STATES PATENTS

| | | | |
|---|---|---|---|
| 2,654,860 | 10/1953 | Lewis................................ | 318/490 |
| 2,747,162 | 5/1956 | Attura............................. | 318/490 X |
| 2,929,010 | 3/1960 | Lancaster et al................... | 318/490 |
| 3,482,236 | 12/1969 | Seney.............................. | 318/490 X |

*Primary Examiner*—B. Dobeck
*Attorney, Agent, or Firm*—Sughrue, Rothwell, Mion, Zinn & Macpeak

[57]  ABSTRACT

Increase and descrease of the current flowing through a field coil of a servomotor is detected, and the signal of the detection is used as an output for indicating whether the servosystem is in operation or not.

7 Claims, 10 Drawing Figures

MEANS FOR DETECTING OPERATION OF SERVO-SYSTEM

This invention relates to a means for detecting whether a servosystem is in operation or not, and more particularly to a detecting means to be used in an automatic retrieval type optical reader wherein a number of images recorded on a film or the like are brought into alignment with an optical axis of an optical projection system for detecting whether a servosystem used for bringing the film to a desired position is in operation or not.

The description of the present invention will be made hereinbelow with particular reference to the above mentioned type automatic optical reader in which a servomechanism is used for selectively bringing a desired frame of image into alignment with the optical axis of the optical projection system provided therein. It will be understood, however, the detecting means in accordance with the present invention can be applied to any type of servosystem in view of its construction and operation described hereinbelow.

For better understanding of the present invention, it will be useful to explain the operation of a conventional type optical reader in which the above-mentioned automatic retrieval servomechanism is employed. The construction and operation of the prior art servomechanism employed in the conventional automatic retrieval type optical reader will be made explicit from the following description taken in conjunction with the accompanying drawing:

FIG. 1 is a time chart showing the sequence of operations of the conventional automatic retrieval type optical reader in which a servomechanism is used, FIG. 2 is a block diagram showing the circuit of an X–Y direction film transfer device used in the conventional automatic retrieval type optical reader with a servomechanism, and FIG. 3 is a graphical representation showing the wave shape of the field current flowing through a servomotor of the X–Y direction film transfer device.

Figure 1:
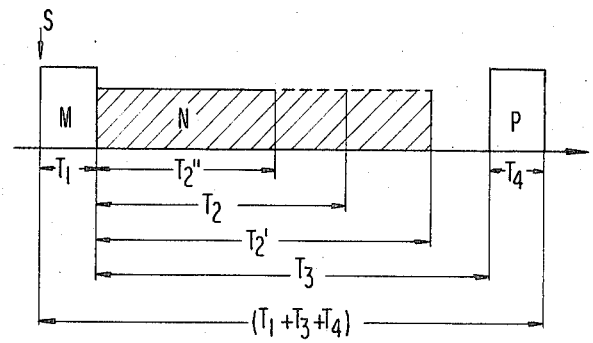

In the conventional automatic retrieval type optical reader in which an X–Y direction film transfer device provided with a servomechanism is employed, when a start signal S and a coordinate signal of the desired image frame are put in by a key board or a computer, a preparation operation M to move the film for closing a shutter and removing the film from a focussing mechanism is started and the preparation operation M is completed a predetermined time, $T_1$ seconds, after the start as shown in FIG. 1. Further referring to FIG. 1, immediately after the completion of the preparation operation M a film transfer operation N of the X–Y direction transfer device is started by the servomechanism. The X–Y direction film transfer device keeps on operating until the desired image frame comes to the optical axis of the optical system for observation or printing. The duration, $T_2$ seconds, of operation of the X–Y direction film transfer device depends on the distance of transfer of the film depending on the position of the desired image frame, and accordingly, varies from the minimum duration $T_2''$ to the maximum $T_2'$. On the other hand, a predetermined time $T_3$ after the start of the film transfer device N, a projection operation P for bringing the film into contact with the focussing mechanism and opening the shutter for observation or printing is started and the projection operation P is completed $T_4$ seconds after the start thereof.

However, the predetermined time $T_3$ set by a timer relay in the X–Y direction film transfer device is determined to be longer than the maximum duration $T_2'$ required to bring the farthest image frame to the optical axis, and accordingly, the retrieval time of the automatic retrieval type optical reader is always $(T_1+T_3+T_4)$ seconds regardless of the length of the actual time required to bring the image frame to the projection position. Therefore, there is always a loss of time after the completion of the film transfer N and before the start of the projection operation P, which is as long as $T_3 - T_2$ seconds.

If there is a means such as a detection circuit for detecting whether the servomotor is in operation or not to know when the X–Y direction film transfer device finishes its transfer operation N, it becomes possible to start the projection operation P immediately after the completion of the film transfer operation N thereby shortening the retrieval time of the automatic reader.

It has been known in the art to detect the completion of the X–Y direction film transfer operation by detecting the balance of a servo-amplifier of the servomechanism employed in the film transfer device. This method of detection, however, is disadvantageous in the following points. Since a chopper amplifier is generally used as the servo-amplifier in the above method and the output signal thereof is A.C. current, it is necessary to rectify and smooth the A.C. signal in order to electrically detect the balancing of the signal. Further, since the X-direction servosystem and the Y-direction servosystem are operated independently of each other, it is necessary to obtain the AND value of the completion of the transfer operation of the both systems in order to obtain the signal indicating the completion of the operation of the transfer device as a whole. Consequently, in accordance with the aforementioned conventional method of detecting the completion of the servosystem, the construction of the circuit of the detection means is so much complicated and it is difficult to gain high accuracy in detecting the signal which indicates the completion of the X–Y direction film transfer operation.

Figure 2:
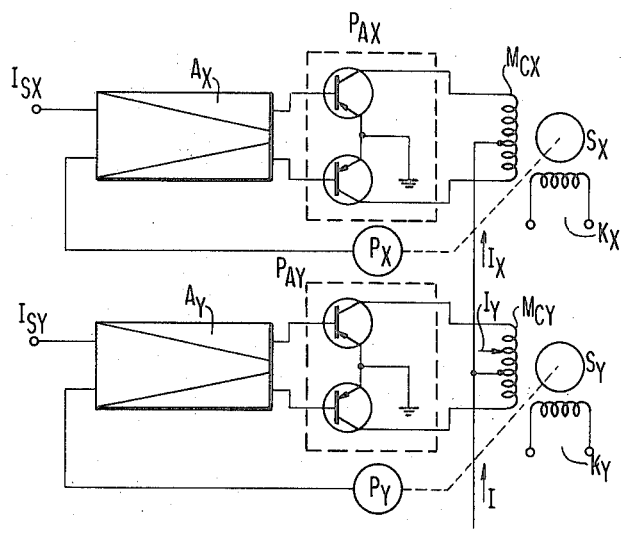

Referring to FIG. 2 showing a block diagram of the circuit employed in the X–Y direction film transfer device, chopper amplifiers $A_X$ and $A_Y$ are used as servoamplifiers. In this circuit, the A.C. output of the chopper amplifiers $A_X$ and $A_Y$ is power amplified by pushpull output amplifiers $P_{AX}$ and $P_{AY}$ without being rectified and directly put in servomotors $S_X$ and $S_Y$.

Figure 3:
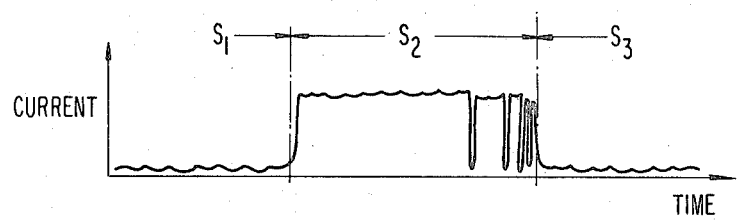

The inventor found the fact that the field currents $I_X$ and $I_Y$ flowing through the intermediate taps of the field coils $M_{CX}$ and $M_{CY}$ of the servomotors $S_X$ and $S_Y$ were direct current and that the current value thereof changed remarkably according to the state of the servomotors $S_X$ and $S_Y$ as shown in FIG. 3, wherein the current value while the servomotors $S_X$ and $S_Y$ are rotating ($S_2$) is several times as large as that while the servomotors are stopped ($S_1$, $S_3$), and the current value thereof was in proportion to the load impressed on the servomotor during the rotation of the servomotor and showed substantially a constant value during the rotation thereof.

In light of the above fact found by the inventor, the primary object of the present invention is to provide a means for detecting and indicating whether the servomechanism for transferring the film is in operation or not by detecting the increase and decrease of the field current flowing through the field coils of the servomotors.

Another object of the present invention is to provide a means for detecting and indicating whether a film transferring servomechanism is in operation or not which has high accuracy and simple construction.

Other objects, features and advantages of the present invention will be made apparent from the following description of the preferred embodiments of the invention taken in conjunction with the accompanying drawing.

Figure 4:
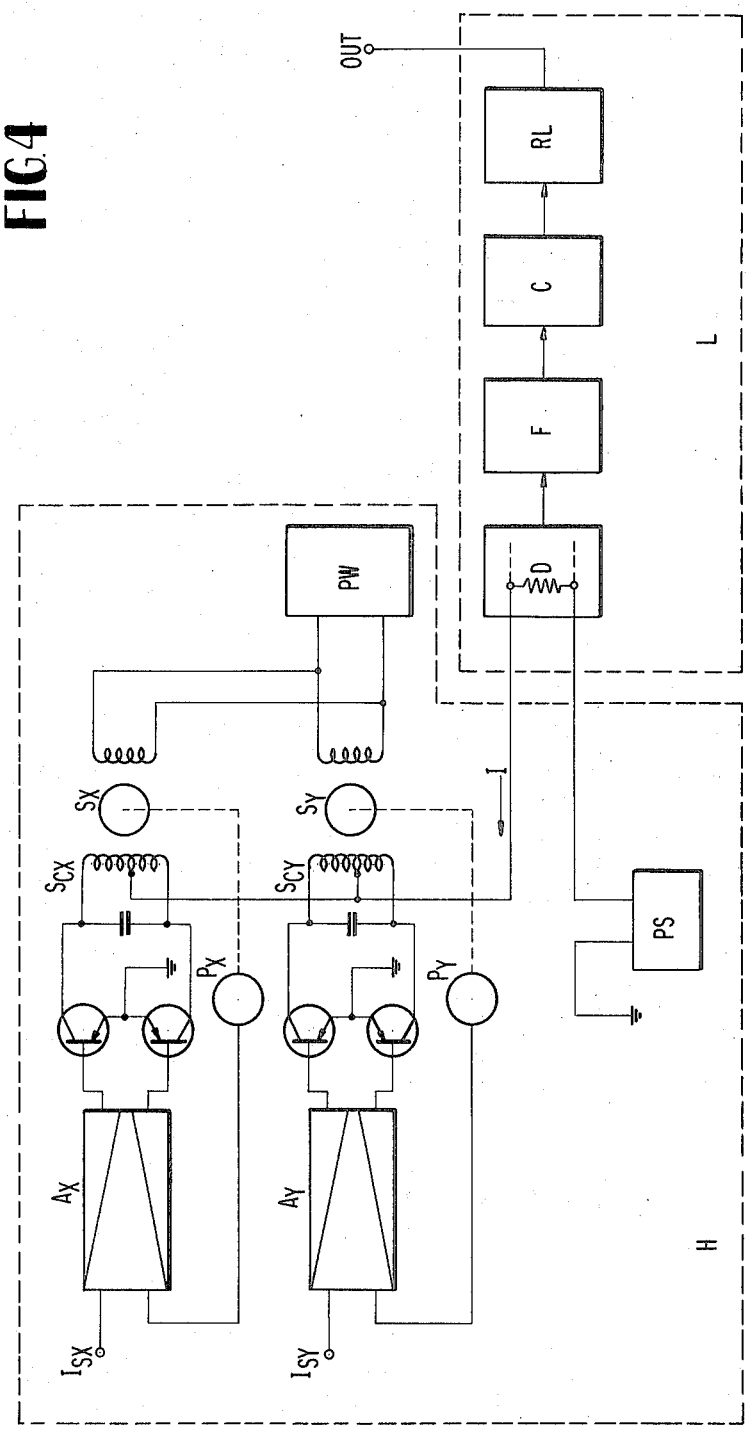
FIG. 4 is a block diagram showing an X–Y direction film transfer servosystem for use in an automatic retrieval type optical reader in accordance with the first embodiment of the present invention.

Referring to FIG. 4 showing an embodiment of the present invention together with an X–Y direction film transfer servomechanism, the X–Y direction film transfer servomechanism comprises an X–Y direction transfer servosystem H and an X–Y direction transfer detecting system L. The X–Y direction transfer servosystem H has the same construction and operation as those of the conventional X–Y transfer servosystem and comprises servomotors $S_X, S_Y$, servo-amplifiers $A_X, A_Y$, potentiometers $P_X, P_Y$, a servomotor armature power source PW, servomotor field power source PS and so forth as illustrated in FIG. 4. The X–Y direction transfer detecting system L comprises a servomotor field current detecting circuit D, a low-pass filter F, a comparator C which may be a Schmit circuit or a proper switching amplifier, and a relay RL.

When a coordinate signal of the desired image frame of the film is put in at the signal input terminals $I_{SX}, I_{SY}$ of the servo-amplifiers of the transfer device, the servomotors $S_X, S_Y$ are rotated to start the film transfer. At this moment, the servomotor field current I increases from the state $S_1$ to the state $S_2$. In the actual example according to this first embodiment, the servomotor current of 80mA during the stop state of the X–Y direction transfer servosystem increased up to 500 to 900 mA after the start of the operation thereof.

Thereafter, when the image frame comes to the optical axis for projection or printing and the output value of the potentiometers $P_X$ and $P_Y$ become coincident with the voltage of the input signal put in at the terminals $I_{SX}, I_{SY}$, the servomotors $S_X$ and $S_Y$ stop rotation and accordingly complete the transfer operation thereof and the servomotor field current I decreases down to the state $S_3$ shown in FIG. 3.

Figure 5A:
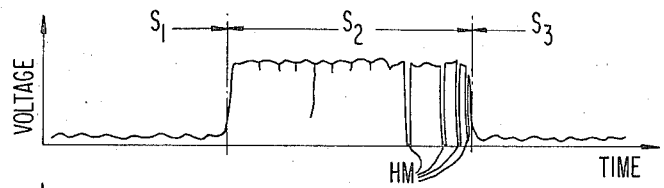
FIGS. 5a, 5b and 5c are graphical representations showing wave shapes of field voltage at various processes of said first embodiment of the present invention.

The servomotor field current I is converted to a voltage signal by the servomotor field current detecting circuit D in the X–Y direction transfer operation detecting system L shown in FIG. 4. The servomotor field current detecting circuit D can be made by connecting a resistor R in series between the servomotor field power source PS and an intermediate tap of the servomotor field coils $M_{CX}$ and $M_{CY}$. The resistor R should be so selected as not to influence the servosystem. The wave shape obtained by the detecting circuit D was as shown in FIG. 5a, in which the voltage was low during the stop of the X–Y direction transfer servosystem ($S_1, S_3$) and high during the operation of the transfer servosystem ($S_2$) like said wave shape as shown in FIG. 3. When a resistor of 2 ohm was used in the above embodiment, the lower voltage during the state of $S_1$ and $S_3$ was 160mV and the higher voltage during the state of $S_2$ was 1.2 to 1.8V according to the servomotor field current detecting circuit D.

Figure 5B:
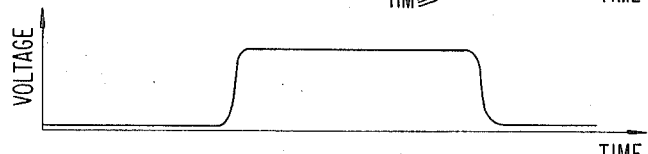
Figure 6:
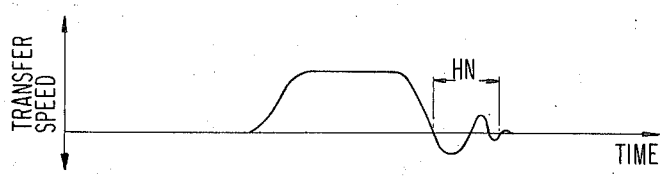
FIG. 6 is a graphical representation showing the transfer speed of the film transferring servomechanism used in the above embodiment of the invention.

In the signal detected by the servomotor field current detecting circuit D, there are several terms HM where the signal becomes termporarily zero in the shape of pulses during the operation of the X–Y transfer servosystem as shown in FIG. 5a because of the noise of the hunting HN caused by the oscillating movement of the servomotor made prior to the balance thereof as shown in FIG. 6 (The servomotor changes its direction of rotation, and accordingly, the rotation thereof is temporarily stopped.), other noises coming from outside, the chopping noise of the chopper amplifier and so forth. These noises can be removed by being passed through the low-pass filter F shown in FIG. 4. Thus, a signal having a wave shape as shown in FIG. 5b can be obtained.

Figure 5C:
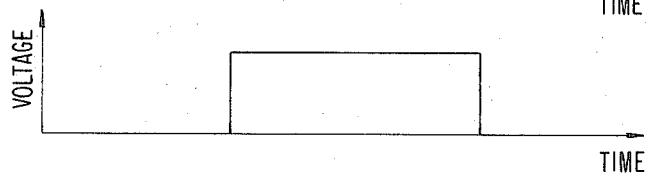

The signal from which the noises have been removed by the low-pass filter F is converted into a rectangular signal as shown in FIG. 5c through said comparator C which signal has zero voltage when the servosystem is not operated. Through the comparator C, the voltage of the signal is made zero when the voltage is below a predetermined voltage level and is made a definite value when the voltage is above the predetermined voltage level is determined so that it can be clearly distinguished whether the servomotors $S_X, S_Y$ are being rotated or not, that is, whether the servosystem is in operation to transfer the film or not. Thus, a signal wave as shown in FIG. 5c can be obtained. The comparator can be made by putting the output of the low-pass filter in the base of a common-emitter connection transistor amplifier utilizing the switching characteristic of the amplifier.

The output signal from the comparator C shown in FIG. 4 is put out through the relay RL to indicate whether the X–Y direction transfer servosystem is in operation or not, and can be used as a signal for starting the projection or printing operation P to open the shutter, move the film into contact with the focussing mechanism and so forth. Thus, the time of retrieval from the input of the coordinate signal given by a keyboard or a computer for retrieval of a desired image frame on a film to the projection of the image onto a screen or printing of the image can be shortened. In an example according to the above embodiment, the retrieval time of the conventional system of about 2 seconds was shortened to 0.2 to 1.8 second. Thus, the retrieval time of the automatic retrieval type optical reader is remarkably improved in accordance with the present invention.

Figure 7A:
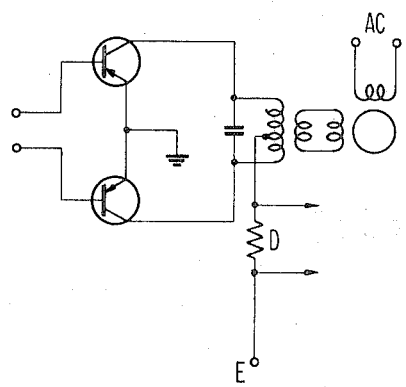
FIGS. 7a and 7b are circuit views of other embodiments of the present invention.
Figure 7B:
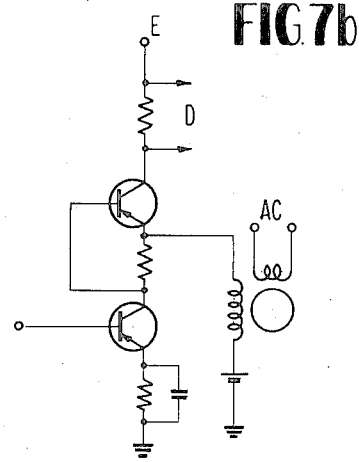

It will be understood that the A.C. output amplifier combining the servo-amplifier and the servomotor is not limited to the push-pull type (direct combination type) but may be another push-pull type (transformer combination type) as shown in FIG. 7a or a series balance type as shown in FIG. 7b by detecting the field current of the servomotor.

Further, it will be understood that the present invention can be applied not only to a one direction servosystem of an automatic retrieval reader and a two direction servosystem as mentioned above, but also to any type of servosystem.

What is claimed is:

1. A method of detecting whether a servomotor system is operating, wherein the servosystem includes a first servomotor comprising an armature winding, means for applying A.C. power to said armature winding, a center-tapped field winding, means for applying an A.C. control signal across the ends of the field winding, the method comprising the steps of:
   a. detecting the level of only D.C. field current flowing through the center tap of the field winding,
   b. comparing the detected current level with a threshold current level which defines the boundary between operation and non-operation of the servomotor, and
   c. producing a first signal indicative of servomotor operation when the detected level is above the threshold level and a second signal indicative of servomotor non-operation when the detected level is below the threshold level.

2. A method as defined in claim 1 wherein the servosystem includes a second servomotor identical to the first servomotor and wherein the two center taps are connected in parallel, and wherein the detecting step further comprises detecting the level of the total D.C. field current flowing through both center taps.

3. In a servosystem including a servosystem having a first servomotor comprising an armature winding, means for applying A.C. power to the armature winding, a center-tapped field coil, means for applying an A.C. control signal across the ends of the field coil, and a servomotor field power source for applying D.C. power to the center tap, the improvement which comprises:
   a. means for detecting the level of only D.C. field current flowing through the center tap of the field coil;
   b. means coupled to said detecting means for comparing the detected field current level with a threshold current level and producing a first signal indicative of servomotor operation when the detected level is above the threshold level and a second signal indicative of servomotor non-operation when the detected level is below the threshold level.

4. The improvement defined in claim 3 comprising a low-pass filter coupled between said detecting and comparing means.

5. The improvement defined in claim 4 further comprising a relay coupled to said comparing means and operated by said first and second signals.

6. The improvement defined in claim 3 wherein the servosystem includes a second servomotor identical to the first, and means connecting the two center taps in parallel, and wherein said detecting means comprises a resistor connected in series with the two parallel-connected center taps for detecting the total D.C. field current flowing to both center taps.

7. The improvement defined in claim 3 wherein said detecting means comprises a resistor connected in series between the field coil of the servomotor and the servomotor field power source.

* * * * *